Nov. 29, 1927.
G. W. DORMAN
1,650,613
SAW SHIFTER
Original Filed Sept. 16, 1925    4 Sheets-Sheet 1
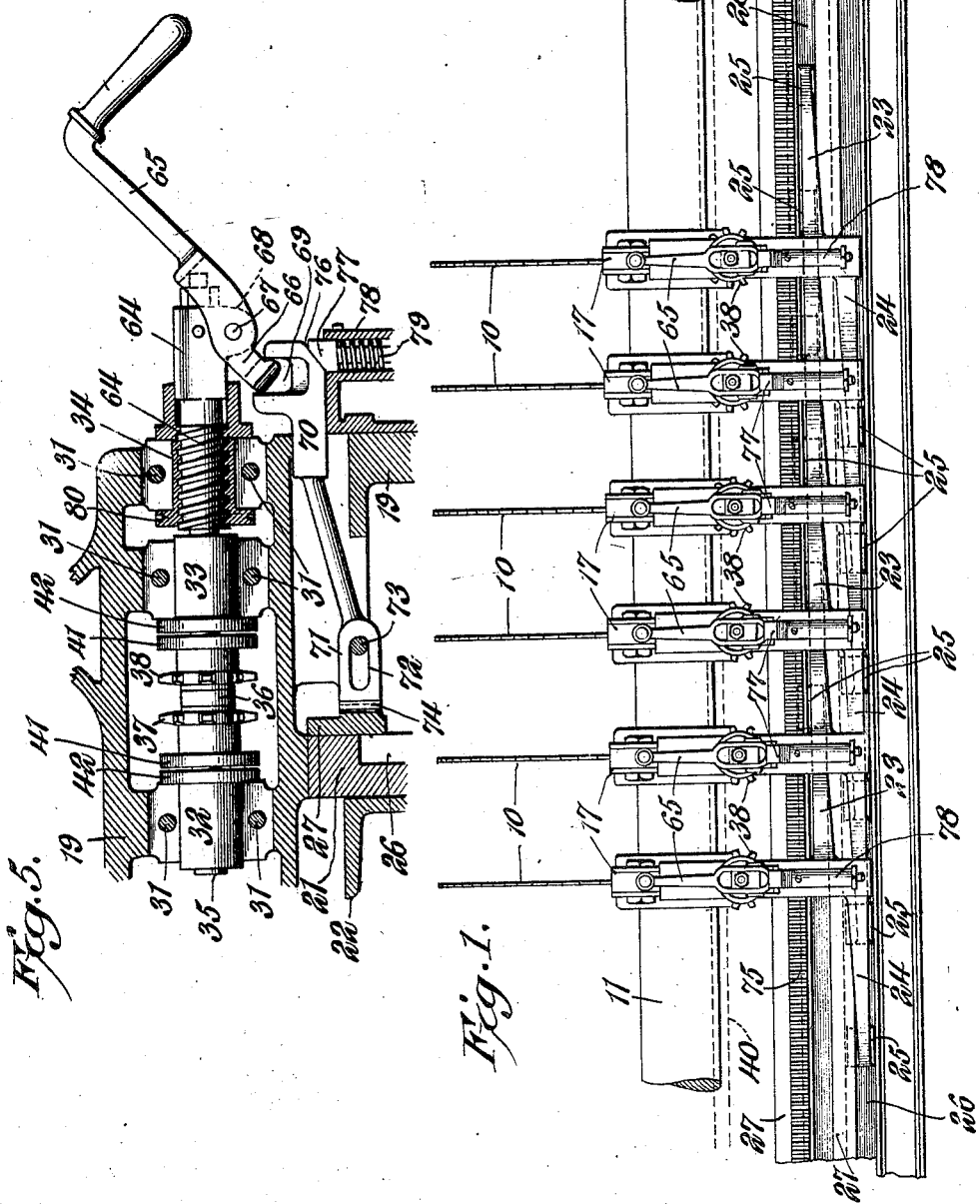
George W. Dorman, INVENTOR,
WITNESSES
BY
ATTORNEY

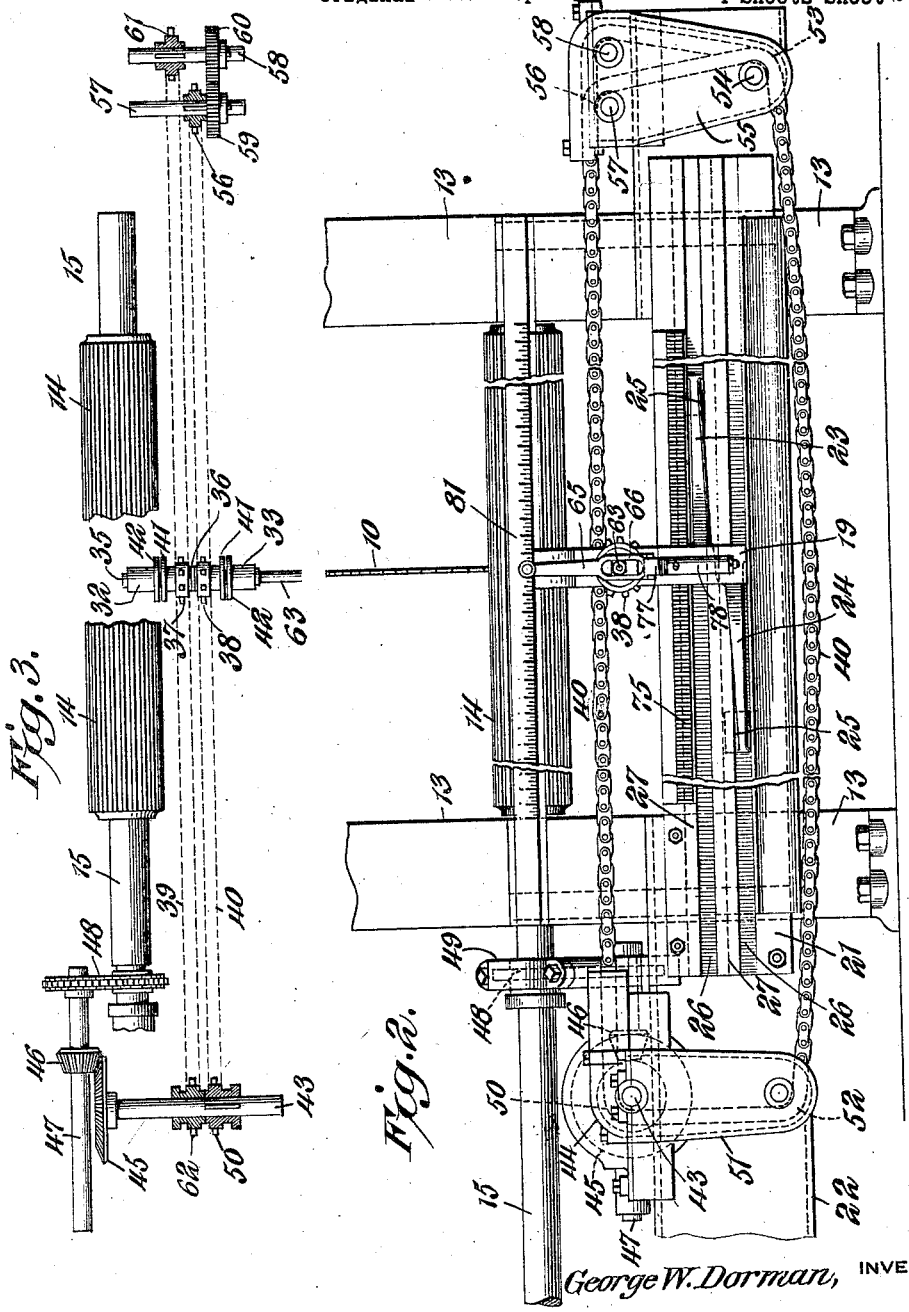

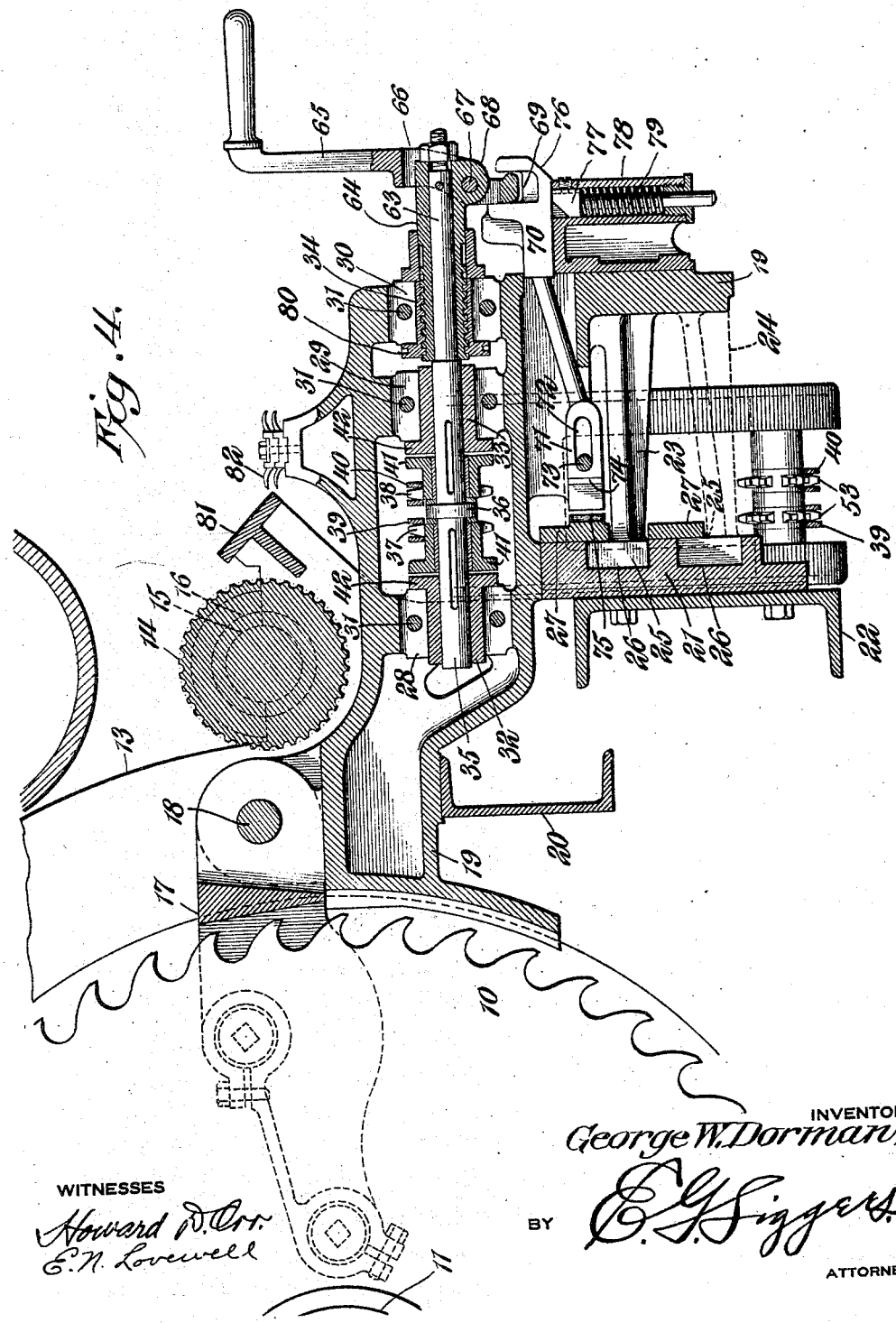

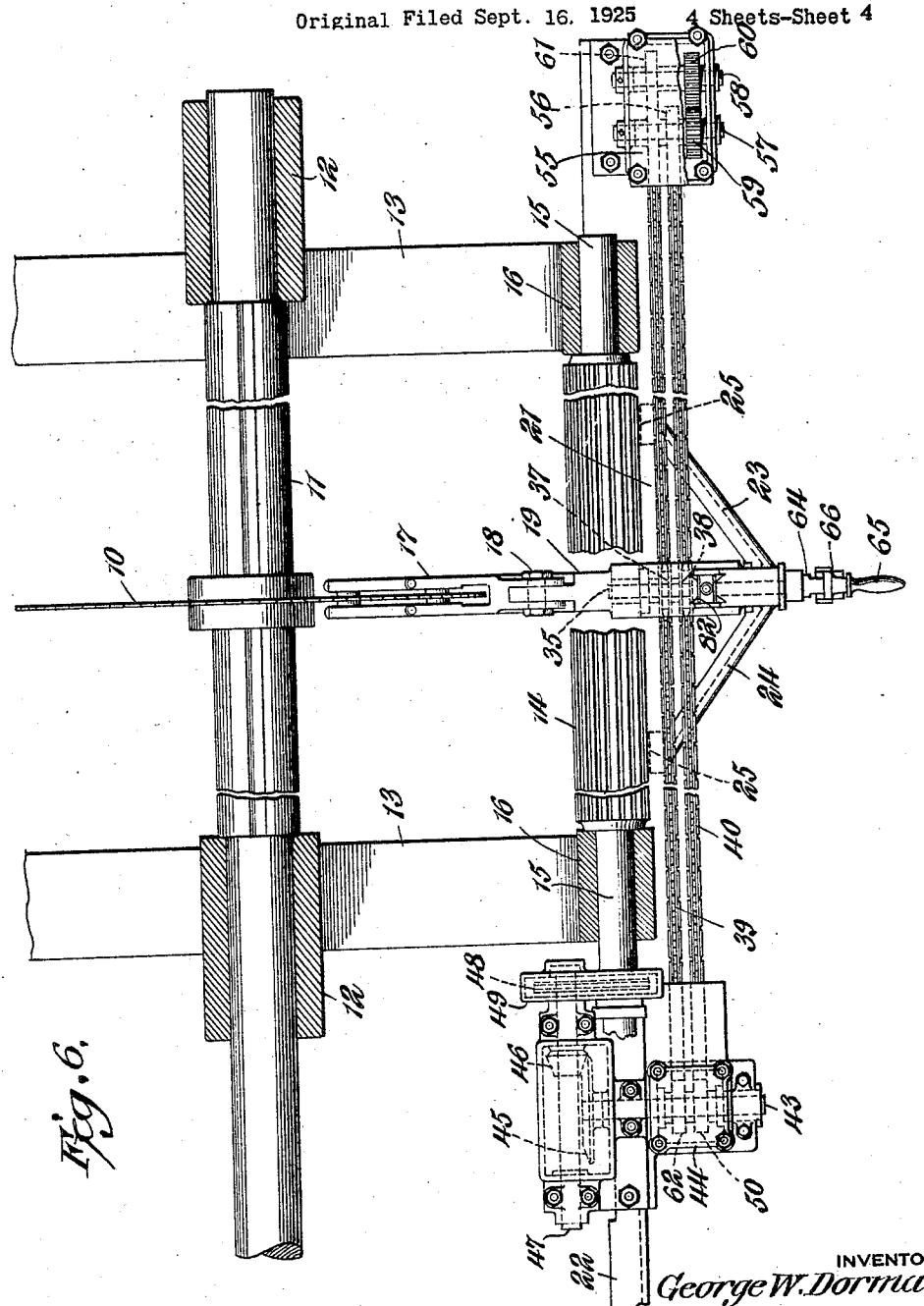

Patented Nov. 29, 1927.

1,650,613

UNITED STATES PATENT OFFICE.

GEORGE W. DORMAN, OF EVERETT, WASHINGTON, ASSIGNOR TO SUMNER IRON WORKS, OF EVERETT, WASHINGTON, A CORPORATION OF WASHINGTON.

SAW SHIFTER.

Application filed September 16, 1925, Serial No. 56,713. Renewed October 14, 1927.

This invention relates to a saw shifter, with particular reference to that class of saws known as gang edgers.

The general object of the invention is to provide simple and efficient means which may be conveniently operated, either by motive power or by hand, to shift one or more saws laterally.

A further and more specific object is to provide means travelling continuously in opposite directions, exemplified, in the present instance, by two roller chains, and means for temporarily connecting the shifter carriage to either chain so as to shift the saw in either direction as far as desired.

The shifting device is also constructed and arranged in such a manner that whenever it is desired to move all the saws in the gang toward one end, all that is necessary to be done is to place all the levers in upright position and operate the one on the end. This shifter will then push the others all down the line.

The invention consists further in certain novel details of construction and combinations of elements, the objects and advantages of which will be more particularly explained with reference to the accompanying drawings, which illustrate one embodiment thereof.

In the drawings:

Figure 1 is a front elevation of a portion of the machine showing a gang of edgers, the shifters and means for controlling the same.

Figure 2 is a front elevation showing the power driven mechanism for effecting the shifting, all but one of the saws and shifters being broken away.

Figure 3 is a fragmentary view, partly in plan and partly in section, illustrating the train of gearing by which the shifting chains are driven.

Figure 4 is a vertical longitudinal section through the shifting mechanism and the means for supporting the same.

Figure 5 is a fragmentary sectional view, illustrating particularly the means for locking the shifter carriage.

Figure 6 is a plan view of the mechanism shown in Figure 2, portions being broken away and shown in section.

The invention is shown in connection with a gang edger having a plurality of saws 10, splined on an arbor 11, which is rotatably mounted in bearings 12 supported on the edger frame 13. The lumber is fed by means of a rotating feed roller 14, having a shaft 15 mounted in bearings 16 on the frame 13.

The position of each saw longitudinally of the arbor is determined by a bifurcated guide arm 17, the front end of which is bolted, at 18, to a carriage 19 supported for slidable longitudinal adjustment on a channel bar 20 and a rail 21, which is bolted to a bar 22. Each carriage has two legs 23 and 24 diverging rearwardly from the lower front rail of the carriage, and each provided with a foot 25. These feet are guided in channels 26 formed in the front face of the rail 21, and are retained therein by keeper strips 27, which are secured to the bar and overhang the channels.

Each shifter carriage is in the form of a skeleton frame having pairs of opposed clamping strips 28, 29 and 30, which may be drawn together by bolts 31 to clamp the respective collars 32, 33 and 34 thereon. A rocker shaft 35 is mounted in these collars, and is provided substantially midway between the collars 32 and 33 with an annular shoulder 36. Sprocket wheels 37 and 38 are rotatably mounted respectively on opposite sides of the shoulder 36, and over these sprockets pass roller chains 39 and 40, respectively.

The chains 39 and 40 are caused to travel in opposite directions, and the sprocket wheels 37 and 38 are normally rotated thereby. The hubs of the respective sprocket wheels are formed with peripheral flanges 41 having flat faces which normally are slightly separated from the corresponding faces of flanges 42 formed on the respective collars 32 and 33. By moving the shaft 32 in the direction of its length, therefore, the shoulder 36 will cause either one of the sprocket hubs to engage the adjacent end of the corresponding collar, and the co-engaging faces of the flanges 41 and 42 act as a disk clutch, thus clutching the sprocket to the collar and stopping its rotation, whereupon further travel of the sprocket chain will force the shifter carriage to travel therewith.

The travel of the chains 39 and 40 is effected through the medium of a shaft 43, which is journaled within a housing 44 mounted at one side of the edger frame. The shaft 43 has a bevel gear 45 secured to one end, which meshes with a bevel pinion 46 secured on a jack shaft 47, also journaled in the housing 44. The shaft 47 is connected to the feeder shaft 15, and driven therefrom by means of sprocket gearing 48 housed within a gear casing 49. The shaft 15 may be driven from any suitable source of power, which also drives the saws. The chain 40 passes from the sprocket 38 over a sprocket 50 which is keyed to the shaft 43, so that the chain 40 is directly driven thereby. From the sprocket 50 the chain 40 passes downwardly within a housing 51 about an idler sprocket 52, and thence underneath the carriage to the other side of the edger frame, where it passes about a sprocket 53 on a shaft 54 mounted in a housing 55, and thence upwardly and over a sprocket 56 on a shaft 57, and thence back to the sprocket 50. Another shaft 58 is journaled in the housing 55 beside the shaft 57, and is driven therefrom but in the opposite direction by means of spur gears 59 and 60 mounted on the shafts 57 and 58, respectively. A sprocket 61 is keyed to the shaft 58, and the chain 39 passes over the sprocket 61 and is driven thereby in an opposite direction to the travel of the chain 40. The chain 39 passes from the sprocket 61 over sprocket 37 and a sprocket 62 rotatably mounted on the shaft 43, and passes thence underneath the carriage and back to the right hand side of the edger, in the same manner as chain 40. Thus, it will be understood that whenever the saws are in operation, the chains 39 and 40 are caused to travel continuously in opposite directions.

For the purpose of shifting the rocker shaft 35 in either direction to cause either the sprocket 37 or 38 to be clutched to the corresponding collar 32 or 33, said rocker shaft has a forwardly extending reduced portion 63 on which is secured a sleeve 64. This sleeve extends through the collar 34, and is formed with double threads which engage corresponding internal threads formed in the collar 34. By rocking the shaft 35, therefore, and the sleeve 64, only a slight amount, either in one direction or the other, the shaft may be advanced or retracted sufficiently so that either of the sprockets 39 or 40 will be clutched to the corresponding collar, and the shifter carriage 19 will be caused to travel with either the chain 39 or the chain 40.

The shaft 35 may be rocked by means of a handle 65, which is formed with a yoke 66 embracing the front end of the sleeve 64, and connected therewith by a pin 67 which traverses the yoke, and an ear 68 depending from the sleeve 64.

It will be understood, therefore, that when the handle 65 is in the position shown in Figure 4, it may be moved laterally to rock the shaft 35, and advance or retract the latter by means of the threaded connection between the sleeve 64 and collar 34. The handle 65 may also be swung outwardly beyond the pin 67, as shown in Figure 7, for the purpose of locking the shifter carriage after the latter has been adjusted. For effecting this locking function, the yoke 66 projects downwardly into a recess 69 formed in a locking bar 70, which is guided for longitudinal movement, and has a forwardly projecting foot 71 formed with a longitudinal slot 72, which receives a pin 73 secured in the lower part of the carriage frame. The foot 71 terminates in a toe 74, which, when the handle 65 is swung outwardlly, is adapted to engage rack teeth 75 formed on the front side of the upper keeper strip 27, or any other stationary part of the frame, so that the shifter carriage is positively held against movement laterally of the edger frame. When the handle 65 is swung inwardly, as shown in Figure 4, so that its shank is perpendicular to the rocker shaft 35, the toe 74 disengages the rack teeth 75, and the shifter carriage is unlocked.

As a means for retaining the shifter carriage more securely in its locked position, the outer end of the lock bar 70 is provided with an inclined face 76, which is automatically engageable by the inclined face of the lock plunger 77, as shown in Figure 5, this plunger being slidably mounted within a depending sleeve 78 and urged upwardly by a coiled spring 79. The strength of this spring is sufficient to retain the lock bar 70 firmly in locking position, but the plunger 77 may be forced downwardly by the horizontal outward movement of the lock bar 70, when the handle is lifted.

The relation of the collars 32 and 33 to the sprocket wheels 37 and 38 is such that only a comparatively slight rocking movement of the shaft 35 is necessary in order to move it from neutral position into such a position that it will be clutched to either sprocket. The normal position of the shaft 35 may be adjusted by rotating the collar 34. For this purpose, the sleeve is provided with a head 80, which may be engaged by a spanner wrench.

A gage bar 81 is secured to the frame 13 in front of the feed roll 14, and is provided with an appropriate scale, and the carriage is provided with suitable indicating fingers 82 for measuring the position of the saw.

Although means have been provided for connecting the shifter carriage to either one of the chains 39 or 40, so that the shifting operation may be effected by the same source of power that drives the saw, the shifter carriage may also be moved manually in case the power mechanism should get out of order, or the power be shut off. To do this, it is only necessary, after the lock bar 70 has been retracted so as to unlock the carriage, and after the handle has been rocked laterally to clutch one of the sprocket wheels to the corresponding collar, to continue to move the handle in the same direction until the carriage is moved manually to the desired position. When it is desired to move all the saws toward one end, it is only necessary to unlock the several shifter carriages by moving all of the handles 65 to an upright position, and then by shifting the shaft 35 on the end carriage, cause it to move toward the other carriages. Each carriage will engage the next, so that all will be pushed down the line.

While the invention is shown and illustrated in connection with a gang edger, it is obvious that the essential features thereof can be applied with advantage to any machine that requires frequent and rapid positioning of a cutting tool or similar element. It saves a great deal of time, and enables the operator to do more and better work. While I have shown and described in detail the construction of one form in which the invention may be embodied, it is to be understood that the invention is not limited thereto, but includes all modifications and equivalents which fall within the scope of the appended claims.

What is claimed is:

1. In a shifting device, the combination of a shifter carriage mounted for rectilinear movement, two sprocket wheels rotatably mounted on said carriage, oppositely traveling chain elements engaging the respective sprocket wheels, and means for selectively clutching either of said sprocket wheels to a relatively fixed part of the carriage, so as to stop the rotation of the sprocket wheel and cause the latter and the carriage to travel with the corresponding chain element.

2. In a shifting device, the combination of a shifter carriage mounted for rectilinear movement, two sprocket wheels mounted on said carriage and normally free to rotate, sprocket chains passing over and engaging the respective sprocket wheels, means for driving said chains continuously in opposite directions and thereby normally driving said sprocket wheels in opposite directions, and means for selectively clutching either of said sprocket wheels to a relatively fixed part of the carriage so as to stop the rotation of the sprocket wheel and cause the latter and the carriage to travel with the corresponding chain.

3. In a shifting device, the combination of a shifter carriage mounted for rectilinear movement, a pair of alined bearing collars clamped in said carriage, a shaft mounted in said collars, two sprocket wheels rotatably mounted on said shaft, oppositely traveling chain elements engaging said sprocket wheels, and means for selectively clutching either one of said sprocket wheels to one of the collars so as to stop the rotation of said sprocket wheel and cause the latter and the carriage to travel with the corresponding chain element.

4. In a shifting device, the combination of a shifter carriage mounted for rectilinear movement, a pair of alined bearing collars secured in said carriage, a shaft mounted in said collars, two sprocket wheels rotatably mounted on said shaft between the collars, oppositely traveling chain elements engaging said sprocket wheels, a shoulder on the shaft between the sprocket wheels, and means for moving the shaft lengthwise in either direction to cause said shoulder to engage either one of the sprocket wheels and clutch the same to the adjacent collar, so as to stop the rotation of said sprocket wheel, thereby causing the carriage to travel with the corresponding chain element.

5. In a shifting device, the combination of a shifter carriage mounted for rectilinear movement, a pair of alined bearing collars clamped in said carriage, a shaft mounted in said collars, two sprocket wheels rotatably mounted on said shaft between the collars, oppositely traveling chain elements engaging said sprocket wheels, a third collar clamped in said carriage and having a threaded connection with said shaft, and a handle connected to the shaft and operable to rock the same and, by reason of said threaded connection, to move the same longitudinally in either direction to cause said shoulder to engage either one of the sprocket wheels and clutch the same to the adjacent collar, so as to stop the rotation of said sprocket wheel and cause the latter and the carriage to travel with the corresponding chain element.

6. In a shifting device, the combination of a shifter carriage having a pair of alined bearings, a rocker shaft mounted in said bearings, a handle mounted on said shaft and operable to rock the same, means for moving said rocker shaft longitudinally when it is rocked, two endless elements traveling in opposite directions, said carriage being guided for rectilinear movement parallel to the travel of said endless elements, and means carried by the shaft and operable when the shaft is moved longitudinally in one direction or the other to connect the carriage to one or the other of said traveling elements so as to travel therewith.

7. In a shifting device, the combination of a stationary frame, a shifter carriage having a pair of alined bearings, a rocker shaft mounted in said bearings, a handle mounted on said shaft and operable to rock the same, said handle being also pivoted to swing about an axis transverse to the rocker shaft, two endless elements traveling in opposite directions, said carriage being guided for rectilinear movement in said frame parallel to the travel of said endless elements, means normally rotating idly on the shaft and engaging the respective endless elements and operable when the shaft is rocked in one direction or the other, to connect the carriage to one or the other of said traveling elements so as to travel therewith, and means operable by the handle when swung outwardly about its pivot to lock the carriage to said frame and positively prevent its rectilinear movement.

8. In a shifting device, the combination of a stationary frame, a shifter carriage having a pair of alined bearings, a shaft mounted in said bearings, two sprocket wheels rotatably mounted on said shaft, oppositely traveling elements engaging the respective sprocket wheels, said carriage being guided for rectilinear movement parallel to the travel of said traveling elements, and a handle mounted on the shaft and selectively operable to clutch either of said sprocket wheels to the carriage to stop the rotation of the wheel and cause the carriage to travel with the respective traveling element or to lock the carriage positively to the frame when both sprocket wheels are free to rotate.

9. In a shifting device, the combination of a stationary frame, a shifter carriage, two sprocket wheels rotatably mounted on the carriage, two substantially parallel chain elements, power means for driving said elements in opposite directions, a handle mounted to swing in a vertical plane parallel to the travel of said chain elements, means operable by the swinging of the handle to connect with the carriage the sprocket wheel whose chain element travels in the same direction in which the handle is swung so that the carriage will travel with said chain element, said handle being operable upon further movement in the same direction to shift the carriage in case the power means is not operating.

10. In a shifting device, the combination of a stationary frame, a plurality of carriages guided thereon for rectilinear movement in alinement with each other, two endless elements traveling in opposite directions parallel to the direction in which the carriages may move, a rocker shaft journaled in each carriage, a handle mounted on the shaft and operable to rock the same and normally extending substantially at right angles to said shaft, means operable by the rocking of the shaft in either direction to connect the carriage to either of the endless elements, each handle being also pivoted to swing outwardly about an axis transverse to the respective shaft, means operable by the handle to positively lock the carriage and the frame only when said handle is swung outwardly from its normal position, each carriage, when unlocked, being movable into engagement with the next carriage so that all of said carriages may be moved toward the side of the frame by manipulating the handle on the end carriage.

In testimony, that I claim the foregoing as my own, I have hereto affixed my signature.

GEORGE W. DORMAN.